(12) United States Patent
Aglietto et al.

(10) Patent No.: US 6,451,919 B1
(45) Date of Patent: Sep. 17, 2002

(54) POLYOLEFINS FUNCTIONALIZED WITH MALEIC ANHYDRIDE AND WITH ITS HIGH-BOILING LIQUIDS ESTERS, AND THEIR USE AS PRODUCTS WITH HIGH COMPATIBILIZING POWER

(75) Inventors: Mauro Aglietto; Francesco Ciardelli; Elisa Passaglia; Giacomo Ruggeri, all of Pisa; Giampiero Suffredini, Filicaia, all of (IT); Paolo Marcucci, London (GB); Enzo Mentasti, Barga (IT)

(73) Assignee: Belantro International Corporation, Panama (PA)

( * ) Notice: Subject to any disclaimer, the term of this patent is extended or adjusted under 35 U.S.C. 154(b) by 0 days.

(21) Appl. No.: 09/582,829
(22) PCT Filed: Dec. 30, 1998
(86) PCT No.: PCT/EP98/08511
§ 371 (c)(1), (2), (4) Date: Oct. 18, 2000
(87) PCT Pub. No.: WO99/35172
PCT Pub. Date: Jul. 15, 1999

(30) Foreign Application Priority Data

Dec. 31, 1997 (IT) ......................................... MI97A2903

(51) Int. Cl.[7] .................................................. C08F 8/14
(52) U.S. Cl. ..................... 525/285; 525/327.7; 525/384
(58) Field of Search .............................. 525/285, 327.7, 525/384

(56) References Cited

U.S. PATENT DOCUMENTS 3,267,173 A 8/1966 Zeitlin ........................ 260/878
3,862,265 A 1/1975 Steinkamp et al. .......... 260/878
3,882,194 A * 5/1975 Krebaum et al. ............ 525/285
3,954,912 A * 5/1976 Werner et al. ............... 525/244

FOREIGN PATENT DOCUMENTS

| EP | 0137940 | 4/1985 |
| EP | 0581360 | 2/1994 |
| GB | 1088267 | 10/1967 |

OTHER PUBLICATIONS

J. Swiatek, "Modification of Polyethylene with Maleic Esters", 993 Kautschuk Gummi Kunstroffe 48 (1995) Dec., No. 12.

* cited by examiner

Primary Examiner—Bernard Lipman
(74) Attorney, Agent, or Firm—Abelman, Frayne & Schwab (57) ABSTRACT

Described herein are polyolefins functionalized with maleic anhydrid and at least one high-boiling ester of the latter, and a process for their preparation in high yields, with high degrees of functionalization, without the production of by-products of cross-linking or degradation. The process, which may be carried out either continuously or discontinuously, is characterized by the use of inorganic substances having a specific porosity, grain size, density and humidity, as vehicles of the functionalizing monomers; the presence of maleic ester contributes to enhancing the reaction efficiency. Likewise described herein is a double-screw extruder devised for carrying out the said process, and the use of products obtained as compatibilizing additives in the field of adhesive and reinforcing polymers.

15 Claims, 9 Drawing Sheets

POLYOLEFINS FUNCTIONALIZED WITH MALEIC ANHYDRIDE AND WITH ITS HIGH-BOILING LIQUIDS ESTERS, AND THEIR USE AS PRODUCTS WITH HIGH COMPATIBILIZING POWER

The present invention refers to polyolefins functionalized with maleic derivatives, their preparation, and their use in the field of compatiblization of polymeric compositions.

PRIOR ART

Olefin polymers and copolymers modified by functionalization of unsaturated monomers have been known for some time and have been used mainly as impact modifiers in polyamide compositions (impact-resistant agents), as modifiers of the viscosity of lubricant oils, or as adhesive components to be interposed between materials which are incompatible with one another.

In the field of reinforced materials, maleic anhydride is the most widely used functionalizing monomer. Examples of polymers functionalized with maleic anhydride are EVA, polyethylenes having different densities (LLDPE, VLDPE, ULDPE, HDPE), EPR, EBR, EPDM, etc. Also known are polyamide-reinforced compositions containing the said polymers as impact-resistant agents.

Functionalization or polyolefins is usually made via addition of radical initiators to mixtures of polyolefin and a functionalizing monomer, either via a continuous process in suitable extruders, or via a non-continuous process in closed mixers.

To increase the compatibilizing power of functionalized polymers, attempts have been made to increase the percentage of functionalization. However, in the case of polyolefins functionalized with maleic anhydride the functionalization yield is not high and involves a considerable residue of non-reacted anhydride. To increase the percentage of functionalization it is therefore necessary to use sophisticated plants, with an accurate control of temperature, a high number of degassing positions, as well as safety devices and devices for controlling environmental pollution (cf. Reactive Extrusion: Principles and Practice, Ed. M. Xanthos Hanser, pp. 10–16). Maleic anhydride in fact has a considerable volatility (sublimation starting from 53° C.), and its dispersion in the environment is a source of toxicity. The maximum allowable concentration (MAC) in. air for maleic anhydride is 0.25 ppm. In addition, the increase of the percentage of maleic anhydride decreases workability (cf. Makromol. Chem., 1989, 190(6), 1457), thus requiring further steps to ensure uniform incorporation in the polyamides.

The alternative solution, consisting in increasing the level of radical initiator, is not satisfactory, in that it leads to a corresponding increase in undesired phenomena of cross-linking, with formation of gelated products (cf. Reactive Extrusion: Principles and Practice, Ed. M. Xanthos Hanser, pp. 10–16).

The presence of products of cross-linking and gels constitutes a serious limit to the use of functionalized polyolefins. These by-products, in fact, modify the rheology and uniformity of behaviour of the polyolefins, thus rendering their compatibilizing effect irregular, with possible tearing of films, alteration of the functional performance and features of reinforced polymers, or decoupling between materials adhering to one another.

In EP 581360, the use of extruders with a high mixing capacity, associated to the use of extremely pure ethylene copolymers, has enabled a greater homogenization of the initiator and a lower degradation of the product. The polymers are produced in an extruder by feeding in maleic anhydride diluted in high-density polyethylene. However, the values of functionalization with maleic anhydride have been found to be lower than 0.2%.

In U.S. Pat. No. 4,762,890, to melted polyethylene, vehicled inside a double-screw extruder, is added a solution in polar solvent containing maleic anhydride and a peroxide initiator. The functionalizing agent thus solubilized is more dispersible, but on the other hand the polarity of the solvent limits the homogenization of the maleic anhydride in the polyethylene hydrophobic phase. In this case, the functionalization values have been found to be lower than 1%.

Polyolefins with a high degree of functionalization have been obtained using diethyl maleate as functionalizing agent, instead of maleic anhydride. However, problems have been encountered as regards uniform mixing and presence of products of cross-linking and degradation (cf. J. Serb. Chem. Soc., 56, 1991, 191).

Lately it has been possible to create polyethylenes functionalized with diethyl maleate with a high degree of functionalization and a low degradation by working in extruders or Brabander mixers and operating with a precise maleate/radical initiator ratio (cf. Gazz. Chim. Ital., 1977, 127, p.1). Also this solution is not exempt from drawbacks: in fact, given the greater reactivity of the maleate with respect to the anhydride, it is necessary to work in reduced times, in extremely efficient conditions of mixing, and within restricted quantitative ratios between the reagents used.

EP 137 940 describes a process to prepare polyolefin rubbers modified with maleic anhydride and one or more di $C_1$–$C_{10}$ esters of maleic or fumaric acid; this document does not disclose how to prepare compounds with functionalization degrees comprised between 2% and 20%; no specific compounds having the above functionalization degrees are disclosed and/or prepared in this document; according to this document polyolefins grafted with maleic anhydride contain gels in amounts up to 3% by weight.

All these attempts bring out the impossibility of achieving high levels of functionalization in an efficient way in the case of polyolefins functionalized with maleic derivatives. Such products prove obtainable only at the expense of adopting costly adaptations of the process and working in restricted windows of operating conditions. There thus remains unresolved the problem of obtaining, in high yields and without impurities, polyolefins that are highly functionalized with maleic derivatives. There is likewise felt the need for bringing about functionalization in an industrially simple way and with wide margins of operating conditions.

SUMMARY

Described herein are polyolefins functionalized with maleic anhydride and at least one high-boiling ester of the latter, and a process for their preparation in high yields, with high degrees of functionalization, without the production of by-products of cross-linking or degradation. The process, which may be carried out either continuously or discontinuously, is characterized by the use of inorganic substances having a specific porosity, grain size, density and humidity, as vehicles of the functionalizing monomers; the presence of maleic ester contributes to enhancing the reaction efficiency. Likewise described herein is a double-screw extruder devised for carrying out the said process, and the use of products obtained as compatibilizing additives in the field of adhesive and reinforcing polymers.

DESCRIPTION OF THE FIGURES

FIG. 1: Co-rotating double-screw extruder.
(a): feeding point of the functionalising mixture
(b): feeding point of the polyolefin to be functionalised
(c), (d): degassing valves
(e): double-screw screw batcher
Temperature profile:
  T1: 80° C. (feeding-in of polymer)
  T2–3: 200° C.
  T4: 200° C. (feeding-in of the functionaliser)
  T5–10: 200° C.
  T11: 190° C.
  T12: 180° C. (product output)

DETAILED DESCRIPTION OF INVENTION

The problems referred to above have been unexpectedly solved by the invention described in what follows. The subject of the present invention are polyolefins functionalized with maleic anhydride, and at least one high-boiling liquid ester of the latter.

By polyolefins are meant polymers or copolymers of a non-polar nature, whether saturated or unsaturated of olefins, such as ethylene, propylene, butylene, etc. Examples of such polymers are polyethylene, polypropylene, ethylene vinyl acetate (EVA), ethylene propylene rubber (EPR), ethylene butylene rubber (EBR), ethylene-propylene-diene monomer (EPDM), high-density polyethylenes (HDPEs), linear low-density polyethylenes (LLDPEs), very low-density linear polyethylenes (VLDPEs), ultra low-density linear polyethylenes (ULDPEs).

By high-boiling liquid ester of maleic anhydride is meant any ester of maleic anhydride with a boiling point (bp) higher than 150° C.

The preferred ester is diethyl maleate (DEM, bp 219.5° C.). Other examples of high-boiling liquid esters usable in the invention are dimethyl maleate, dipropyl maleate, dibutyl maleate, di-isopropyl maleate, di-isobutyl maleate, and mono-esters, such as methyl maleate, ethyl maleate, propyl maleate, butyl maleate, isopropyl maleate, and isobutyl maleate.

In the present invention the degree of functionalization is expressed as a total weight percentage of functionalizing agent (maleic anhydride+maleate or maleates) with respect to the starting polyolefin. The method for determining the degree of functionalization is described in the experimental part. The polyolefins according to the present invention may be functionalized up to values such as 12%, 15%, 18%, 20%, 30%, and beyond. A preferred functionalization interval is between 2% and 20%, or more preferably between 4% and 15%.

The ratio between the amounts used of maleic anhydride and maleate(s) may be varied over a wide range. As an example, the process of functionalization may be carried out with ratios between maleic anhydride and maleate(s) of 0.25, 1, 2, 3, and 4 in the feeding-in phase.

Preferably, the functionalizing agent is a binary system consisting of a single ester in association with the anhydride. Alternatively, ternary quaternary, etc. systems are possible, where the polyolefins are functionalized with maleic anhydride and two or more of its esters.

The functionalized polyolefins according to the present invention are substantially free from products of cross-linking, as emerges from the absence of the formation of gels and substances insoluble in toluene. In addition, the product has a much more limited variation in molecular weight than that obtainable with known processes, which makes it possible to maintain unaltered the rheological properties of the starting polymer without variations of workability in the course of the functionalization process.

The functionalized polyolefins described herein present high compatibilizing properties: on the basis of these properties, they can mix intimately with other polymer materials, such polyamides and polyesters, improving the characteristics thereof, such as impact resistance and adhesive properties between incompatible materials.

The present invention is therefore also directed at the use of the functionalized polyolefins described above as compatibilizing or reinforcing additives for polymeric compositions. The compatibilizing agent may be used in mixtures for the preparation of composite materials or may be interposed as binding agent between materials that are mutually incompatible. The modified polyolefins described herein therefore find use, for example, as impact-resistant agents for polyamide or polyester compositions in the sector of bumpers.

A further embodiment of the present invention is the use of the functionalized polyolefins as hereabove described as compatibilizing or reinforcing agents for polymeric compositions.

The polyolefins of the present invention may moreover be used as homogenizing additives in mixtures of re-cycled plastic materials, or as an intermediate adhesive layer for the coupling mating of incompatible materials, such as polyamides and polyolefins, with applications in the field of moquettes or in that of multi-layer films for the packaging of foodstuffs.

Further examples of uses linked to compatibilization are the use as an adhesive layer between an epoxy resin and polyethylene in the sector of pipe coatings, or the use as an adhesive layer between polyolefins and metals, for example in PE-aluminium composite panels for the building industry.

The present invention comprises an efficient process for obtaining the polyolefins described above with high degrees of functionalization, in high yields, and substantially free from cross-linking products. The process may be carried out continuously in extruders (single-screw or, preferably, co-rotating double-screw mixers), of discontinuously in closed mixers (Brabender mixer).

The process is characterized by the sequence of steps indicated below:

a) Preparation of a free-flowing dry composition (free-flowing dry blend) containing the maleic anhydride, the high-boiling maleic ester (or esters), one or more radical initiators, and an appropriate quantity of high-porosity, hydrophobic solid inorganic carrier;

b) Feeding of the dry mixture obtained in step a) into the polyolefins to be functionalized.

The mixture described in a) is prepared by adding, in a dissolver under stirring, the solid maleic anhydride to the maleic ester (or esters), with complete solubilization of the anhydride in the liquid ester. The presence of the maleate as solvent of the maleic anhydride enables the addition of the latter also in coarse forms, such as flakes. The dissolution in the high-boiling ester takes place at room temperature. To the solution obtained, the radical initiator (or initiators) is added, and finally the inorganic carrier.

The radical initiator is chosen from between the peroxides and the hydroperoxides commonly used in polyolefin functionalization reactions. The most commonly used initiators are dicumyl peroxide, terbutyl peroxide, and dibenzoyl peroxide. The initiators may be used individually or as a mixture of two or more.

The inorganic solid carrier is chosen from among silicates, aluminas, or zeolites having a surface area of between 100 and 400 $m^2/g$; cumulative total volume of pores, between 1 and 2.5 $cm^3/g$; average diameter of particles, between 5 and 50 $\mu m$; average number of hydroxyls, both vicinal and isolated, (determined via infrared spectrophotometry or development of gas) of less than 1 mEq OH/g; water content, less than 0.5 wt %.

These products are obtained normally by means of co-precipitation, spraying, or via the limited-coalescence process.

The inorganic carrier is added to the solution of maleic anhydride, maleate and peroxides, in quantities such that the total amount of pores of the carrier exceeds by 10–30% the volume of the solution to be adsorbed. The system is kept under stirring until a dry free-flowing solid mixture is obtained.

This mixture is then added to the polymer to be functionalized. The procedures of addition vary according to whether the functionalization is to be carried out continuously in extruders or discontinuously in closed mixers.

In the first case, the solid mixture is fed continuously into the extruder, for example through a screw batcher or a high-pressure pump, in the plasticization areas and/or immediately. after these. Alternatively, the addition may be made in the area of feeding-in of the polyolefin pellets via a dedicated screw batcher. The functionalized polyolefins then undergo degassing to remove the fraction of non-reacted maleic anhydride and maleates. This process is carried out through appropriate degassing valves set at the end part of the extruder.

In the case of discontinuous functionalization, the solid mixture may be added at the moment of loading of the polyolefin or, alternatively, after a first plasticization phase of the polyolefin.

The process described herein makes it possible to mix the functionalizing mixture effectively with the polyolefin. Without wishing to be bound by theory, this appears mainly due to the solubilizing function of the maleate in regard to the maleic anhydride, the high availability of the functionalizing mixture adsorbed on the porous substrate, and the intimate incorporateability of the solid mixture in the polyolefin phase. All these factors taken together determine a net increase in the yield and percentage of functionalization, with a lower use of functionalizing agent and a lower dispersion of non-reacted anhydride in the environment, as compared to known processes. The effectiveness of the functionalization is associated to a lower degradation of the polymer, as is noted from the absence of formation of gels and/or products insoluble in toluene. Finally, the process described herein enables an effective modulation of the degree of functionalization, with consequent increase in the range of products obtainable.

A further subject of the present invention are the free-flowing dry blends described above, to be used for feeding in the maleic anhydride and one or more high-boiling maleic esters into the polyolefins to be functionalized. The dry mixtures are characterized by the fact that they contain maleic anhydride, the high-boiling maleic ester (or esters), one or more radical initiators, and an appropriate quantity of high-porosity hydrophobic solid inorganic carrier.

The high-boiling maleic esters have a boiling point higher than 150° C. Examples of such products are those cited in the foregoing pages.

The inorganic solid carrier is chosen from among silicas, aluminas or zeolites, and is characterized, as regards surface area, cumulative total volume of pores, average diameter of particles, average number of hydroxyls, and content of interior water, by the values already mentioned.

The preparation of the free-flowing dry blend is carried out according to the procedure described above according to the type of process of preparation of the functionalized polyolefins.

A further subject of the present invention is a co-rotating double-screw extruder, specifically devised for the execution of the process described above and for the production of polyolefins functionalized with maleic anhydride and one or more high-boiling liquid esters of the latter.

The co-rotating double-screw extruder according to the present invention has a length of 40 diameters, and contains two degassing valves, of which one is set at a distance of 24 diameters from the point of feeding-in of the polyolefin, and the other at a distance of 8 diameters from the first.

Figure 1:
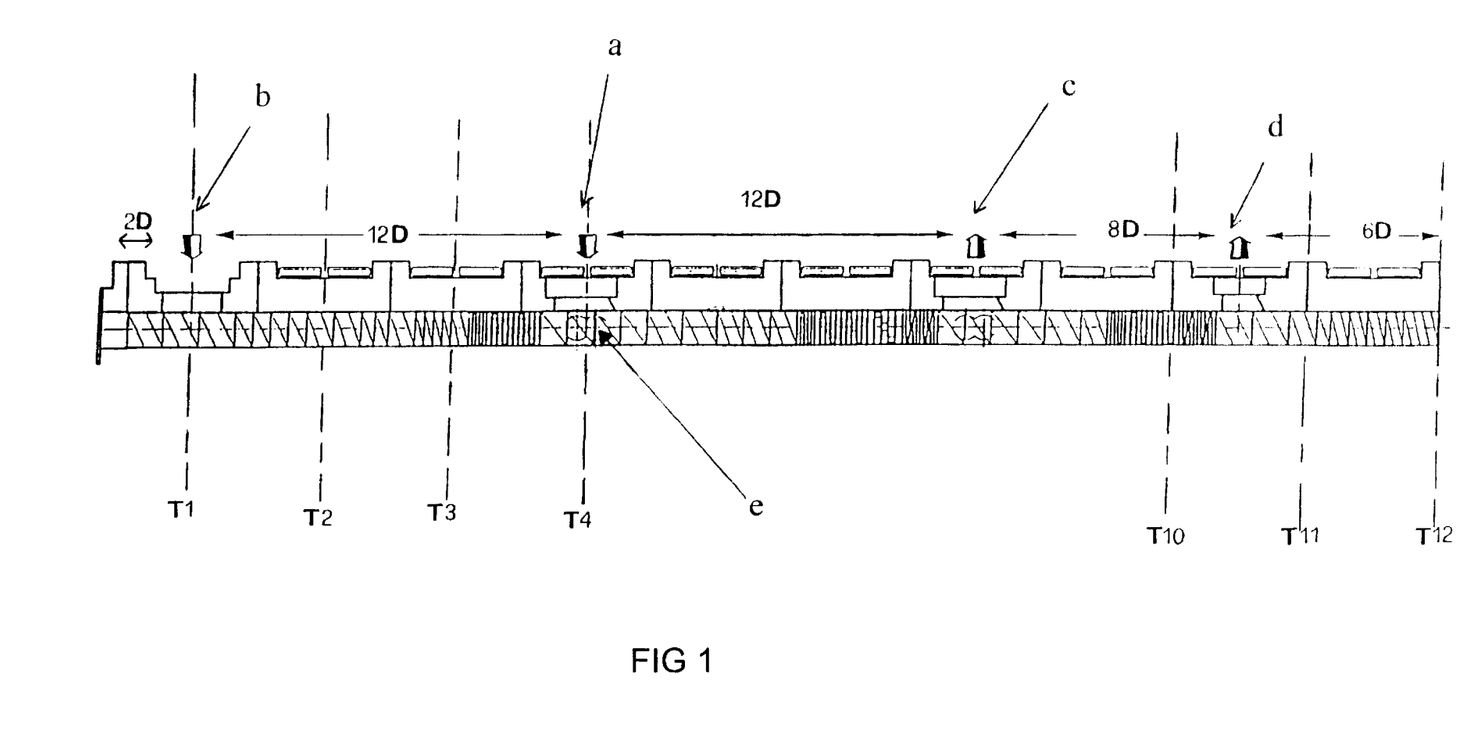

The extruder in question is shown in FIG. 1. The extruder is equipped with two co-rotating screws. The feeding-in of the polyolefin to be functionalized (preferably in granules or pellets) is carried out in the area indicated by (b). In the area (a), set at 12 diameters from the area (b) is fed in the functionalizing solid mixture consisting of maleic, anhydride, high-boiling maleate initiator or initiators, and porous inorganic carrier, previously mixed together. The mixture is fed in by means of a double-screw screw batcher (e). The two degassing valves (c) and (d) are set, respectively, at 24 and 32 diameters from the area (a).

The two valves may be made to operate simultaneously or independently of one another.

The extruder is equipped with an end cutting device with water bell for the pelletization of the copolymers after the functionalization reaction.

The temperature profile set for the extruder, in the case where diethyl maleate is used as maleic ester, is as follows:

T 1: feeding-in of polymer 80° C.

T 2–3: 200° C.

T 4: (feeding-in of functionalizing agent) 200° C .

T 5–10: 200° C.

T 11: 190° C.

T 12: (output of functionalized polymer) 180° C.

Experimental Part

1. Legend

MAH maleic anhydride

DEM diethyl maleate

DCP dicumyl peroxide

TBPO terbutyl peroxide
EPR ethylene-propylene rubber

2. Determination of Functionalization Degree

The functionalization degree (FD) was determined by means of IR spectroscopy using an appropriate calibration straight line obtained from mixtures of EPR and polydiethyl fumarate. In the case of succinic groups deriving from the introduction of MAH, the procedure adopted was the same, using a correction factor that might take into account the different value of the extinction factor $\epsilon$.

The samples dissolved in toluene were deposited on a KBr lamina, and the film for IR analysis was obtained by evaporation.

Figure 6:
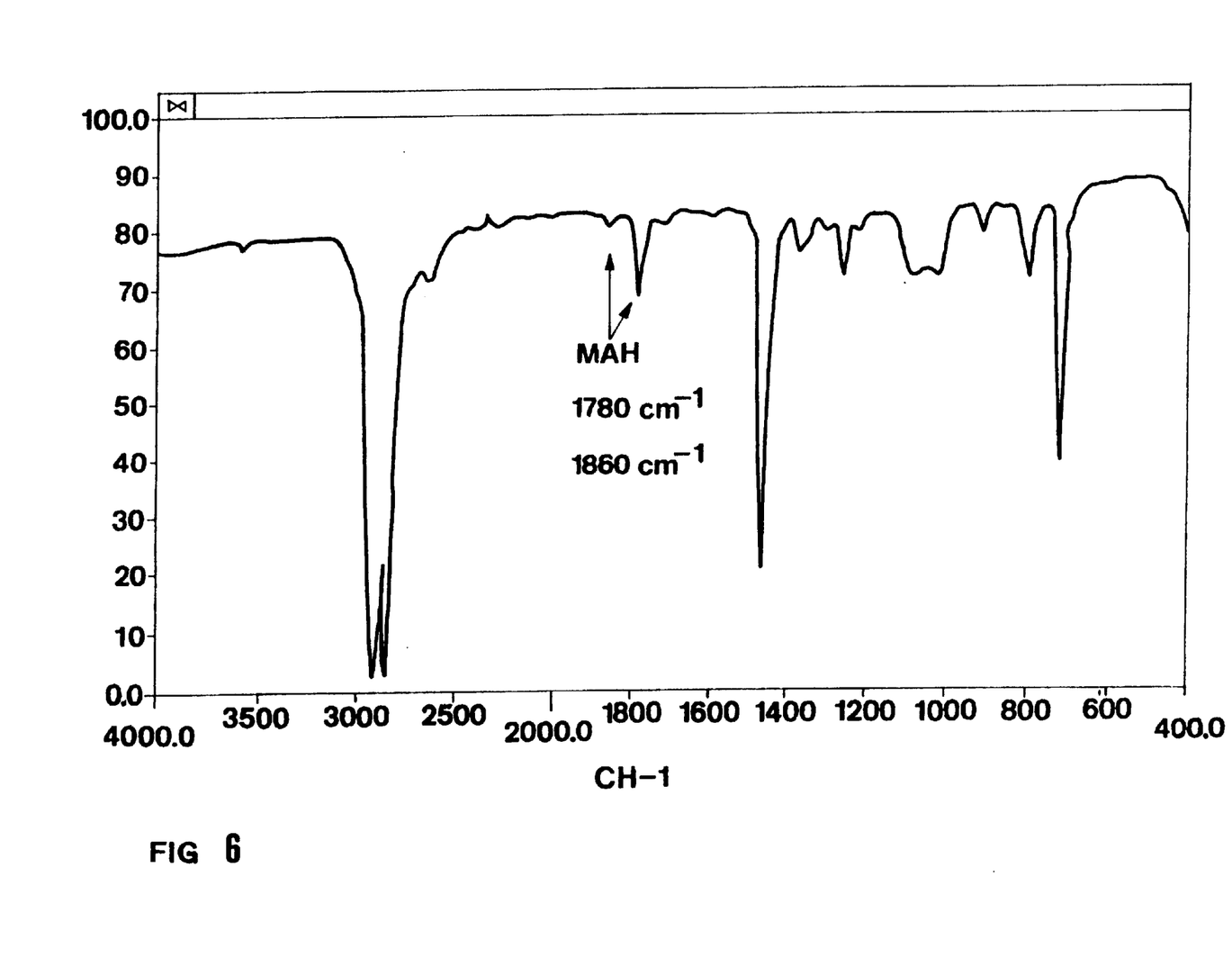
FIG. 6: IR spectrum of polyolefin functionalised with MAH. Continuous process (example A1).
Figure 7:
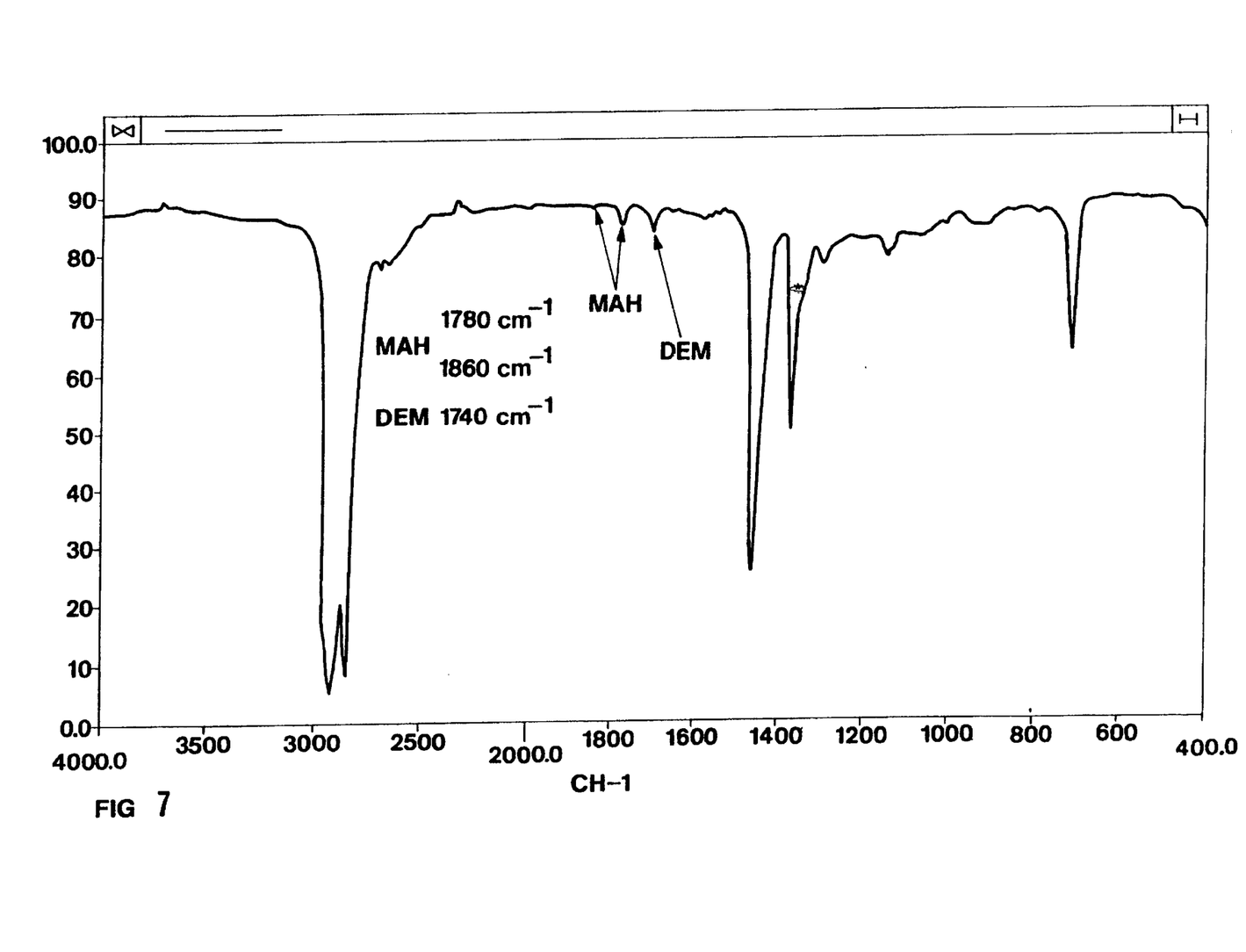
FIG. 7: IR spectrum of polyolefin functionalised with DEM and MAH. Continuous process (example A4).

The IR spectra of the samples functionalized with DEM and MAH presented a peak corresponding to the stretching of the C=O at 1735–1740 cm$^{-1}$ (for DEM) and at 1780–1860 cm$^{-1}$ (for MAH), as emerges clearly from FIG. 7. The peak at 1735–1740 cm$^{-1}$ was absent in the case of products functionalized with MAH alone (see FIG. 6). In both cases a peak was present at 1455–1465 cm$^{-1}$ corresponding to the scissoring and bending of the methylene and of the methyls of the polymer chain.

Figure 2:
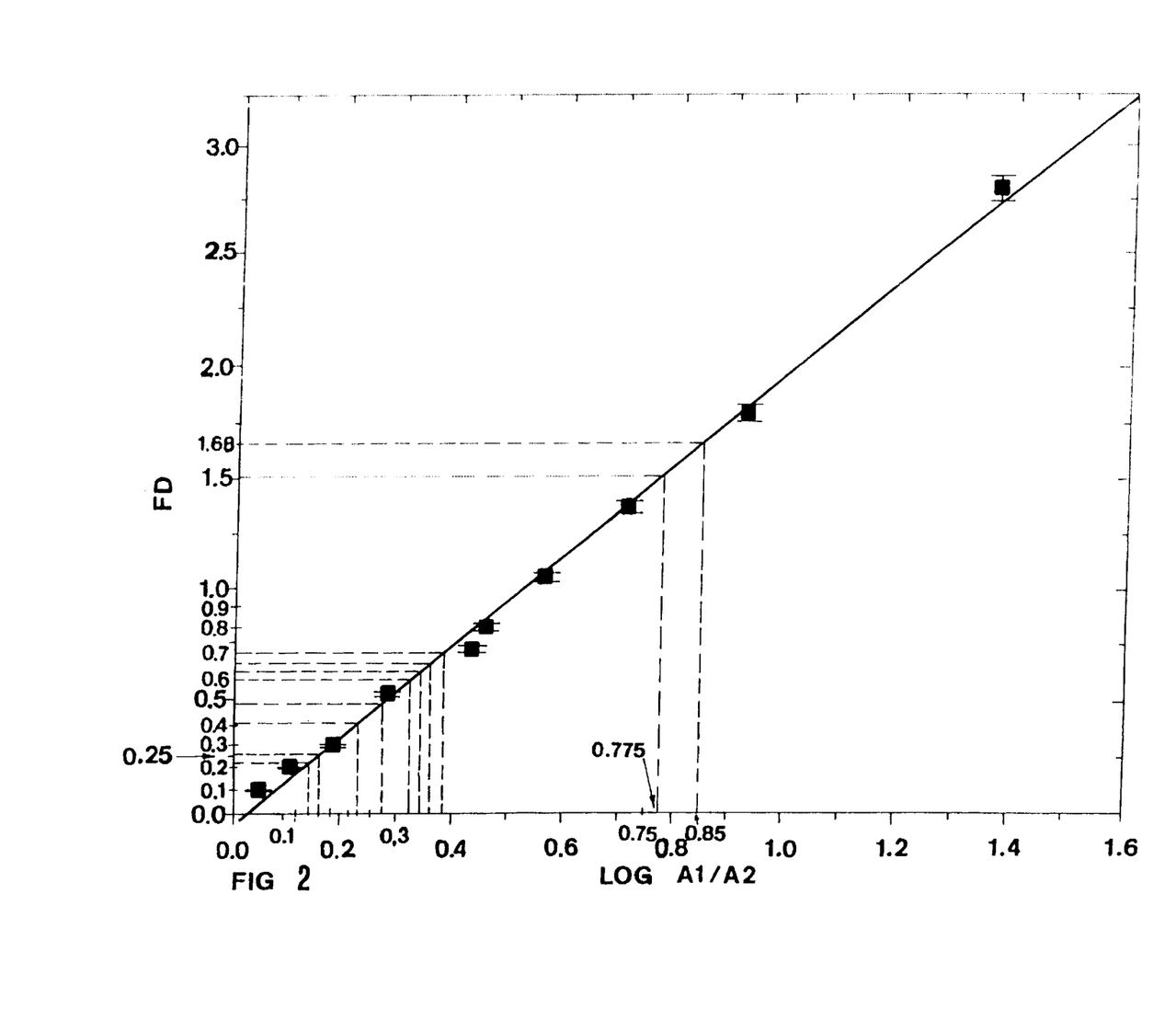
FIG. 2: Correlation table for the determination of the polyolefin functionalisation degree (via $^{13}$C NMR).

The ratio between the area under the double peak and the area under the peak at 1455–1465 cm$^{-1}$ indicates the amount of functionalization. Using the correlation given in FIG. 2, it is possible to calculate the absolute functionalization degree in molar percentage via $^{13}$C-NMR. Considering then the molecular weights, we obtain the corresponding FDs, expressed in weight percentages. The comparison calibrations may be made also via $^{13}$C-NMR and $^1$H-NMR.

The percentage of functionalized maleic anhydride was determined by acid-base titration. Standard solutions of KOH in isopropanol and standard solutions of HCl in isopropanol were used, and, as indicator, phenolphthalein or methyl thymol blue was used after hydrolysis of the anhydride groups to acid.

Before analysis, the sample was extracted with acetone upon boiling in a Kumagawa extractor with the aim of eliminating the maleic anhydride and the DEM that were not functionalized on the polymer. The cross-linked products were determined by means of extraction in a Kumagawa extractor in toluene upon boiling.

3. Determination of Molecular Weights by Gel Permeation Chromatography

The gel permeation chromatography (GPC) analyses of the functionalized polymers were conducted at 135° C. in 1,2,4-trichlorobenzene stabilized with 0.2% of 4,4'-thiobis(6-tert-butyl-m-cresol) (Santonox) with a Waters 150 C chromatograph and using the differential refractometer of this instrument as detector.

The chromatographic separation was performed with a set of four $\mu$ Styragel HT (Waters) columns with pore dimensions of $10^3$, $10^4$, $10^5$, and $10^6$ angstrom, setting a flow rate of 1 ml/min for the eluent.

The data were acquired and processed using Maxima 820 software, Version 3.3 (Millipore). For the calculation of the number and weight average molecular weights, the principles of universal calibration were applied, choosing, for the standard calibration of polystyrene, molecular weights of between 6 500 000 and 1320.

The Mark Houwink constants were calculated on the basis of the co-monomer percentage of the copolymer, applying the Scholte method.

4. Discontinuous functionalization of polyolefins (Brabender mixer)

EXAMPLE 1

In the present example and in the example that follows, mixed-functionalization (MAH+DEM) polyolefins were produced using the known technique, as described here below.

Functionalization was carried out in a Plastigraph Brabender mixer having a mixing chamber of approximately 50 ml. The mixing chamber was brought up to the temperature of 190° C. in a nitrogen atmosphere, and under a stream of nitrogen, 20 g of EPR CO-038 copolymer (propylene content in copolymer, 28%) were introduced whilst the speed of the impellers was kept at 50 r.p.m. After introduction of the polymer, the mixing chamber was closed whilst a slight flow of nitrogen was maintained: After 3 minutes from introduction of the polymer, 1.28 g of DEM were introduced, in which 0.73 g of MAH, 0.13 g of DCP and 0.075 g of TBPO had previously been dissolved. The introduction of this mixture was performed slowly at portions of approximately 0.5 g, so as to minimize the drop in temperature and to reduce the simultaneous evaporation of DEM and MAH. For this purpose, at the moment of addition of the reagents, the flow of nitrogen was suspended. The functionalization time was 30 minutes in all, starting from the introduction of the polymer into the reaction chamber.

The reaction product underwent extraction with acetone upon boiling for 8 hours in a Soxtec extractor. On the residue at this extraction, the degree of functionalization was determined by means of IR spectroscopy, performing the spectrum by deposition of a toluene solution on a KBr lamina.

Figure 3:
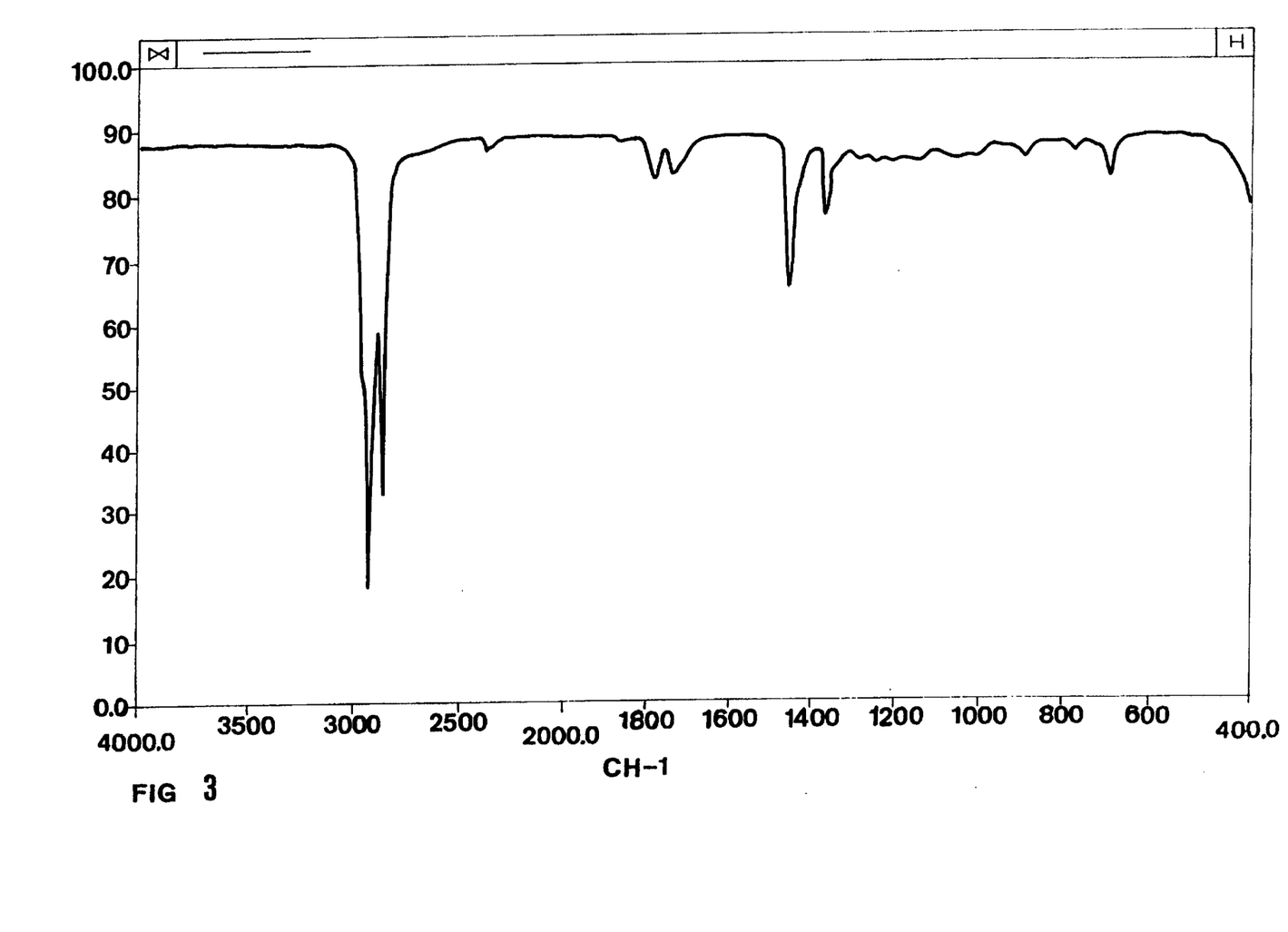
FIG. 3: IR spectrum of polyolefin funtionalised with DEM and MAH.
Discontinuous process (example 1).

The IR spectrum of the product obtained is shown in FIG. 3.

EXAMPLE 2

The experiment of Example 1 was repeated using as functionalizing mixture 1.28 g of DEM, 0.2 g of MAH and 0.20 g of TBPO.

Figure 4:
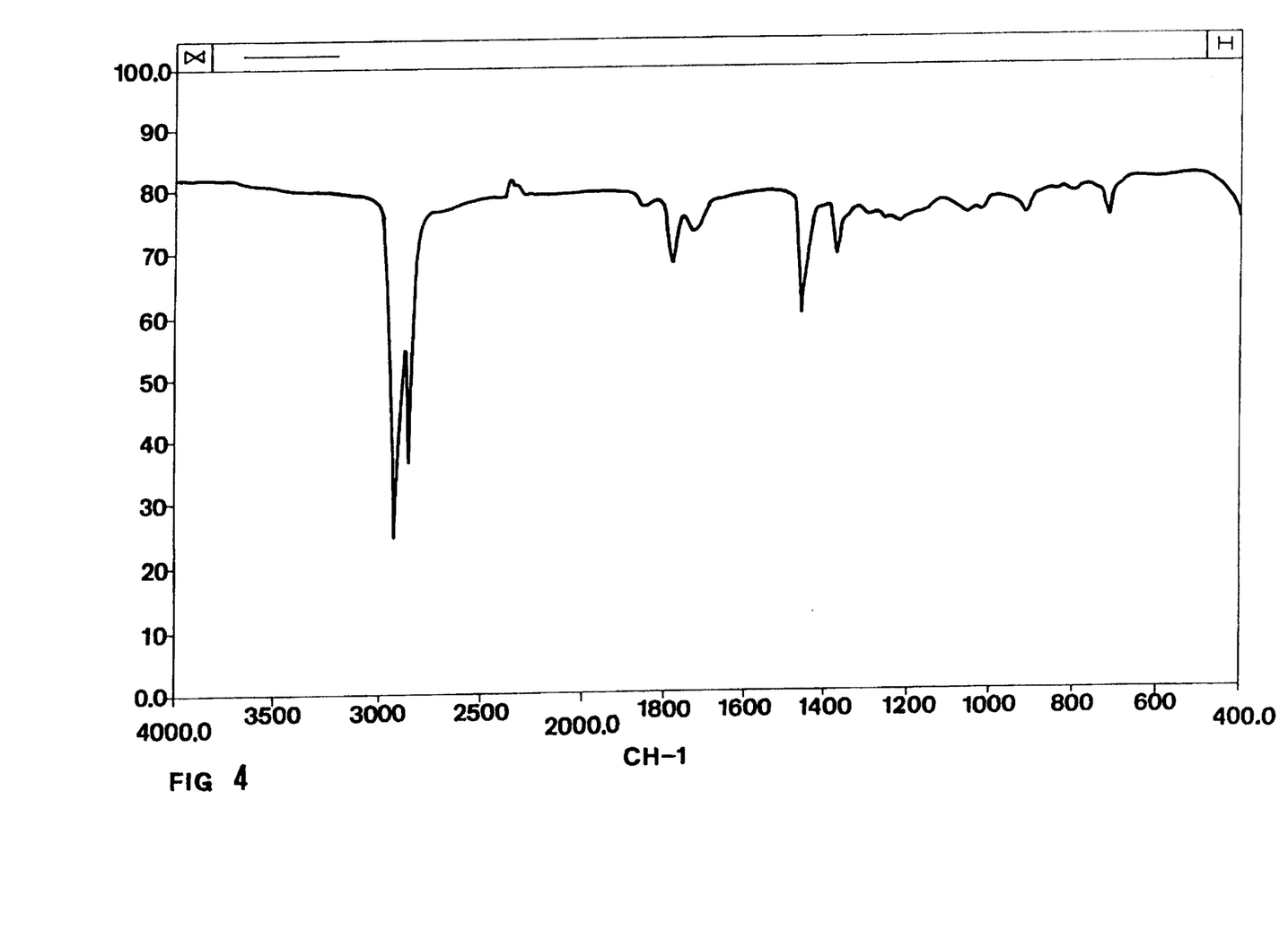
FIG. 4: IR spectrum of polyolefin funtionalised with DEM and MAH.
Discontinuous process (example 2).

The IR spectrum of the product obtained is shown in FIG. 4.

EXAMPLE 3

In this example and in the next one, the polymers described in the previous examples were produced according to the process of the present invention.

The experiment was made using the same amounts of DEM, MAH, DCP, and TBPO used in Example 1. However, in this case the functionalizing agent was not added as a solution, but adsorbed on porous silica in accordance with the present invention.

In a glass reactor equipped with a mechanical stirrer, 1.28 g of DEM were introduced under a stream of nitrogen, followed by 0.73 g of maleic anhydride, 0.13 g of dicumyl peroxide, and 0.075 g of terbutyl peroxide. The mixture was kept stirred until a solution was obtained. To this solution was added 1 g of hydrophobic silica (purity, 99%) having the following characteristics: (a) average size of particles, 5 $\mu$m; (b) surface area, 280 m$^2$/g; (c)cumulative total volume of pores, 1.9 cm$^3$/g; (d) total number of hydroxyls, 0.8 mEq/g SiO$_2$; (e) water content determined by means of Karl-Fisher titration, 0.4 wt %; (f) bulk density, 0.185 g/cm$^3$. Stirring was carried out until a free-flowing dry solid was obtained. The product was added to 20 g of EPR CO-038 copolymer in a Plastigraph Brabender mixer kept at a speed of revolution of impellers of 50 r.p.m. From this point onwards, the functionalization procedure, the recovery of the product, and the determination of the functionalization degree obtained were carried out as described in Example 1.

Figure 5:
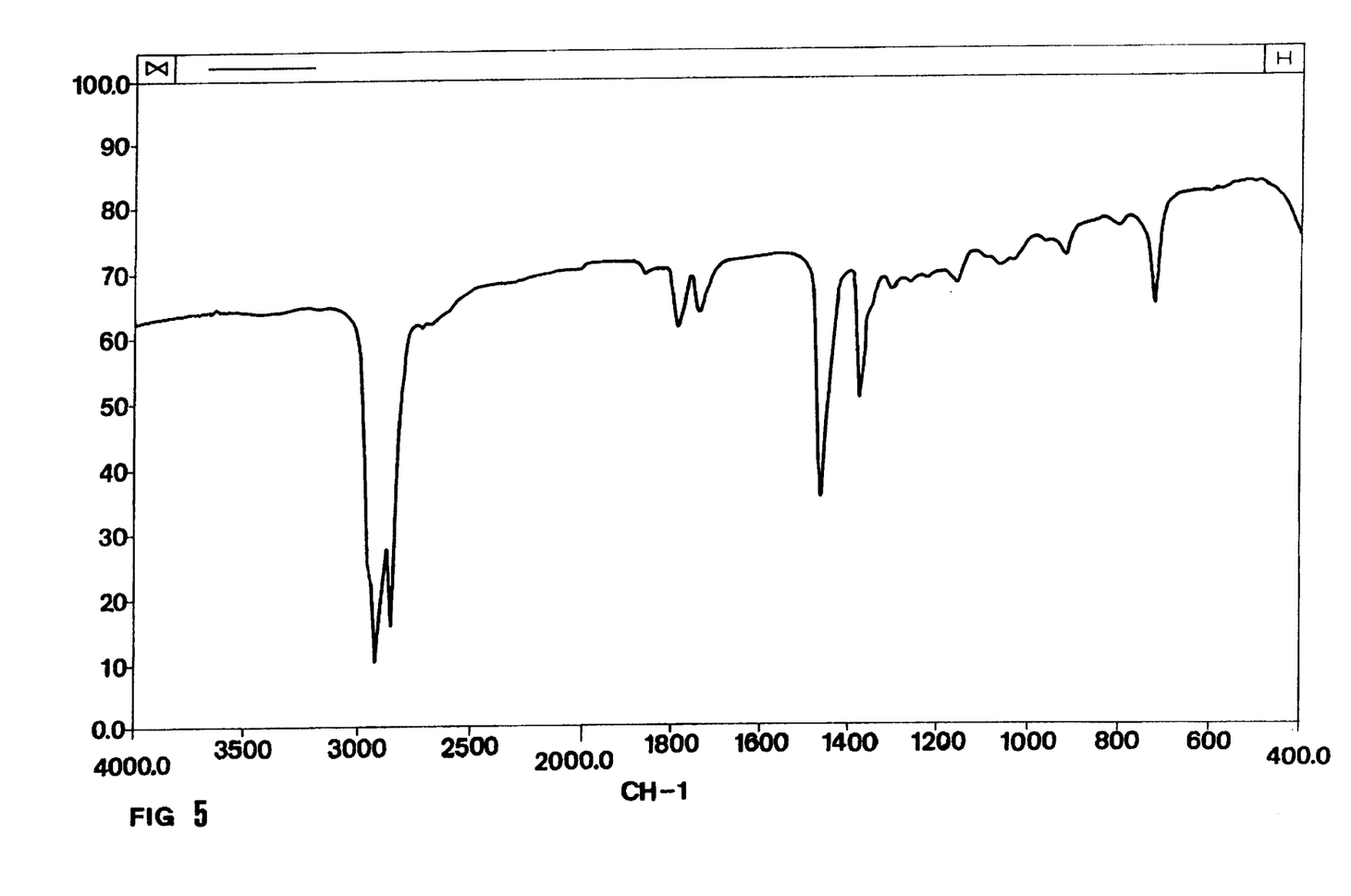
FIG. 5: IR spectrum of polyolefin funtionalised with DEM and MAH adsorbed on porous silica. Discontinuous process (example 3).

The IR spectrum of the product obtained is shown in FIG. 5.

EXAMPLE 4

The experiment described here was conducted using the same amounts of DEM, MAH and TBPO as those used in Example 2. However, in this experiment the functionalizing agent was not added as a solution, but was adsorbed on porous silica in accordance with the present invention. The characteristics of the silica and the procedures for preparation of the functionalizing mixture were those described in Example 3.

The results obtained are shown in Table 1.

reaction efficiency and the purity of the products obtained using the methodologies of Examples 3 and 4.

5. Continuous Functionalization (Co-rotating Double-screw Extruder)

In Examples A1–A3 comparison. polymeric compositions were produced, using, instead of the free-flowing dry blend described in the present invention, mixtures of maleic anhy-

TABLE 1

TESTS OF FUNCTIONALIZATION OF EPR - DISCONTINUOUS PROCESS

| TOTAL FUNCTIONALIZ. EFFICIENCY BOUND WEIGHT FED-IN WEIGHT | TEST | MAH wt % (mol %) | DEM wt % (mol %) | MAH/DEM (mol/mol) | MAH + DEM wt % FED-IN | DCP wt % (mol %) FED-IN | TBPO wt % (mol %) FED-IN |
|---|---|---|---|---|---|---|---|
| 45% | 1 (compar.) | 3.6 (1.2) | 6.4 (1.2) | 1 | 10 | 0.65 (0.077) | 0.37 (0.08) |
| 54% | 2 (compar.) | 1 (0.31) | 6.4 (1.2) | 0.25 | 7.4 | — | 1 (0.22) |
| 65% | 3 | 3.6 (1.2) | 6.4 (1.2) | 1 | 10 | 0.65 (0.077) | 0.37 (0.08) |
| 81% | 4 | 1 (0.31) | 6.4 (1.2) | 0.25 | 7.4 | — | 1 (0.22) |

| TOTAL FUNCTIONALIZ. EFFICIENCY BOUND WEIGHT FED-IN WEIGHT | TEST | % INSOLUBLE IN TOLUENE | DCP + TBPO wt % | $FD_{DEM}$ wt % (mol %) | $FD_{MAH}$ wt % (mol %) | TOT. FD wt % MAH + DEM |
|---|---|---|---|---|---|---|
| 45% | 1 (compar.) | 10.9 | 1.1 | 3.5 (0.65) | 1 (0.34) | 4.5 |
| 54% | 2 (compar.) | 17.9 | 1 | 3.2 (0.6) | 0.8 (0.3) | 4 |
| 65% | 3 | 0 | 1.1 | 4.9 (0.91) | 1.8 (0.61) | 6.5 |
| 81% | 4 | 1 | 1 | 5.1 (0.96) | 0.9 (0.34) | 6.0 |

In Examples 1 and 2, the same quantities of functionalizing agent and radical initiator were used as those used in Examples 3 and 4, respectively. The difference between the two pairs of examples lies in the fact that, whilst in Examples 1 and 2 the functionalizing mixture was added as solution, in Examples 3 and 4 it was added in the adsorbed-on-silica form, according to the process of the present invention.

It may be noted that the reaction efficiency expressed as weight percentage ratio of MAH+DEM fed in to weight of MAH+DEM functionalized, passed from 45% to 65%, and from 54% to 81%, respectively, for the two pairs of examples. Given the same amount of functionalizing agent used, the functionalization degree increased from 4.5% to 6.5%, and from 4% to 6%, respectively, for the two pairs of examples. The greater efficiency of the reaction also leads to a smaller dispersion of toxic vapours of non-reacted MAH.

Unlike the comparison examples, the products of Examples 3 and 4 presented a substantially nil residue upon extraction in toluene; this means that undesired products of cross-linking or gels are not formed. These products were formed, instead, to a significant extent in Examples 1 and 2.

The comparison shows how the process which forms the subject of the invention increases the efficiency of the functionalization reaction and prevents the formation of cross-linking products.

Examples 1 and 2 were repeated, varying the reaction conditions (DEM%, MAH%, radical initiator %). In no case was it possible to obtain products that associated the high dride with high-density powdered polyethylene, as described, for example, in EP 581360.

Examples A4–A6, performed according to the present invention, comprise the use of the free-flowing dry blend described above. In Examples A4–A6, the ratio between the amount of functionalizing agent (MAH+DEM) and the amount of radical initiator in the feeding-in phase was of the same order as that adopted in the comparison examples.

The polyolefin to be functionalized that was used in Examples A1–A6 was an ethylene-propylene rubber (EPR) copolymer in granular form, containing 28% of propylene and having a measured melt flow index (MFI) of 0.5, with a weight of 5 Kg (ASTM D 1238). The molecular weight data obtained by means of GPC analysis were as follows: Mw (weight average molecular weight), 205 000; Mn (number average molecular weight), 67 800; Mw/Mn (distribution of molecular weights)=3.

The extruder used was the one shown in FIG. 1. The thermal profile was the one described previously. The feeding-in of the EPR took place at point (b). The feeding-in of the functionalizing mixture took place at point (a). The speed of rotation of the screws was 100 r.p.m.

Example A1 (Comparison)

In an impeller stirrer the following were added in order: 3 Kg of powdered high-density polyethylene, 2 Kg of maleic anhydride having a purity of over 98%, and 0.130 Kg of dicumyl peroxide.

The extruder was fed with EPR at a rate of 126 Kg/hr, and with the functionalizing mixture at a rate of 3 Kg/hr.

FIG. 6 shows the IR absorption spectrum of the product obtained: the band that may be noted at 1780 cm$^{-1}$ due to the asymmetric stretching of the carbonyl of the maleic anhydride proves that functionalization has occurred. At 1860 cm$^{-1}$ there appears the band due to the symmetric stretching of the carbonyl of the anhydride.

The functionalized polymer underwent extraction with toluene upon boiling for 20 hours, with the aim of identifying, as insoluble phase, possible cross-linking products.

Table 2 gives the weight ratios between the various reagents in the feeding-in stage. Again, Table 2 shows the parameters of the product obtained (molecular weight indices, weight percentage of functionalization, functionalization efficiency, and amount insoluble in toluene). Determination of the functionalized maleic anhydride was made, after washing of the copolymer with acetone to remove the non-reacted anhydride, via acid-base titration, according to the method described in point 2. The functionalization efficiency is given by the percentage ratio between the weight of functionalized maleic anhydride and that of the anhydride fed in. The contact-angle measurements given in the table were carried out in the presence of de-ionized water, at a temperature of 24° C., on the polyolefin extracted with acetone and subsequently pressed to form a film.

As shown in Table 2, the reaction leads to a functionalization efficiency of 36%. The product obtained was found to be free from cross-linking products. As compared to the EPR fed in, the MFI value passed from 0.5 to 1.2.

Example A2 (Comparison)

The test referred to in Example A1 was repeated, following the same procedure but increasing the amount of dicumyl peroxide, in an attempt to increase the efficiency of the reaction. The composition of the functionalizing mixture was thus as follows: 3 Kg of powdered HDPE, 2 Kg of maleic anhydride, and 0.2 Kg of dicumyl peroxide.

The extruder was fed with EPR at a rate of 128 Kg/hr, and with the functionalizing mixture at a rate of 3.1 Kg/hr.

The spectrum of the product obtained presented the same signals as those recorded in Example A1.

The parameters of the product obtained, given in Table 2, show a functionalization efficiency of 48%, associated with the formation of 4% of cross-linked toluene-insoluble products. The MFI increased from 0.5 to 1.5.

Example A3 (Comparison)

Test A2 was repeated, with the difference that the percentage of maleic anhydride fed in was increased in an attempt to increase the efficiency of the reaction. The composition of the functionalizing mixture was thus as follows: 3 Kg of powdered HDPE, 3 Kg of maleic anhydride, and 0.2 Kg of dicumyl peroxide.

The extruder was fed with EPR at a rate of 130 Kg/hr, and with the functionalizing mixture at a rate of 4 Kg/hr.

The spectrum of the product obtained presented the same signals as those recorded in Example A1.

The parameters of the product obtained, given in Table 2, show a functionalization efficiency of 50%, without the formation of toluene-insoluble products. The MFI index increased from 0.5 to 1.

Example A4

The following were fed in order into a 10 l steel container equipped with a mechanical stirrer with impeller: 0.6 Kg of diethyl maleate, 2 Kg of maleic anhydride, and 0.18 Kg of dicumyl peroxide. These were kept stirred until the solid components solubilized in the diethyl maleate. To the solution obtained were added 0.35 Kg of hydrophobic silica (purity, 99%) having the following characteristics: (a) average size of particles, 5 μm; (b) surface area, 280 m$^2$/g; (c) cumulative total volume of pores, 1.9 cm$^3$/g; (d) total number of hydroxyls, 0.8 mEq/g SiO$_2$; (e) water content determined by means of Karl-Fisher titration, 0.4 wt %; (f) bulk density, 0.185 g/cm$^3$. The quantity of silica added corresponded to a total quantity of pores of 0.67 liters (=0.35×1.9 cm$^3$/g).

Stirring was carried out until the solution was completely adsorbed in the silica, and a free-flowing dry solid was obtained. Finally 2 Kg of powdered HDPE were added as diluent with the aim of increasing the precision of dosing through the screw feeder.

The extruder was fed with EPR at a rate of 127 Kg/hr, and with the functionalizing mixture at a rate of 1.5 Kg/hr.

The spectrum of the product obtained, given in FIG. 7, in addition to presenting the same signals as those recorded in Example A1, also revealed a band at 1740 cm$^{-1}$, due to the stretching of the ester carbonyl of the maleate. This confirms that double functionalization took place.

The parameters of the product obtained, given in Table 2, show a functionalization efficiency of 87%, without the formation of toluene-insoluble products. The MFI index increased from 0.5 to 0.6.

Example A5

The test referred to in Example A4 was repeated, with the difference that the rate of feeding-in of the functionalizing mixture was increased to 3 Kg/hr.

Figure 8:
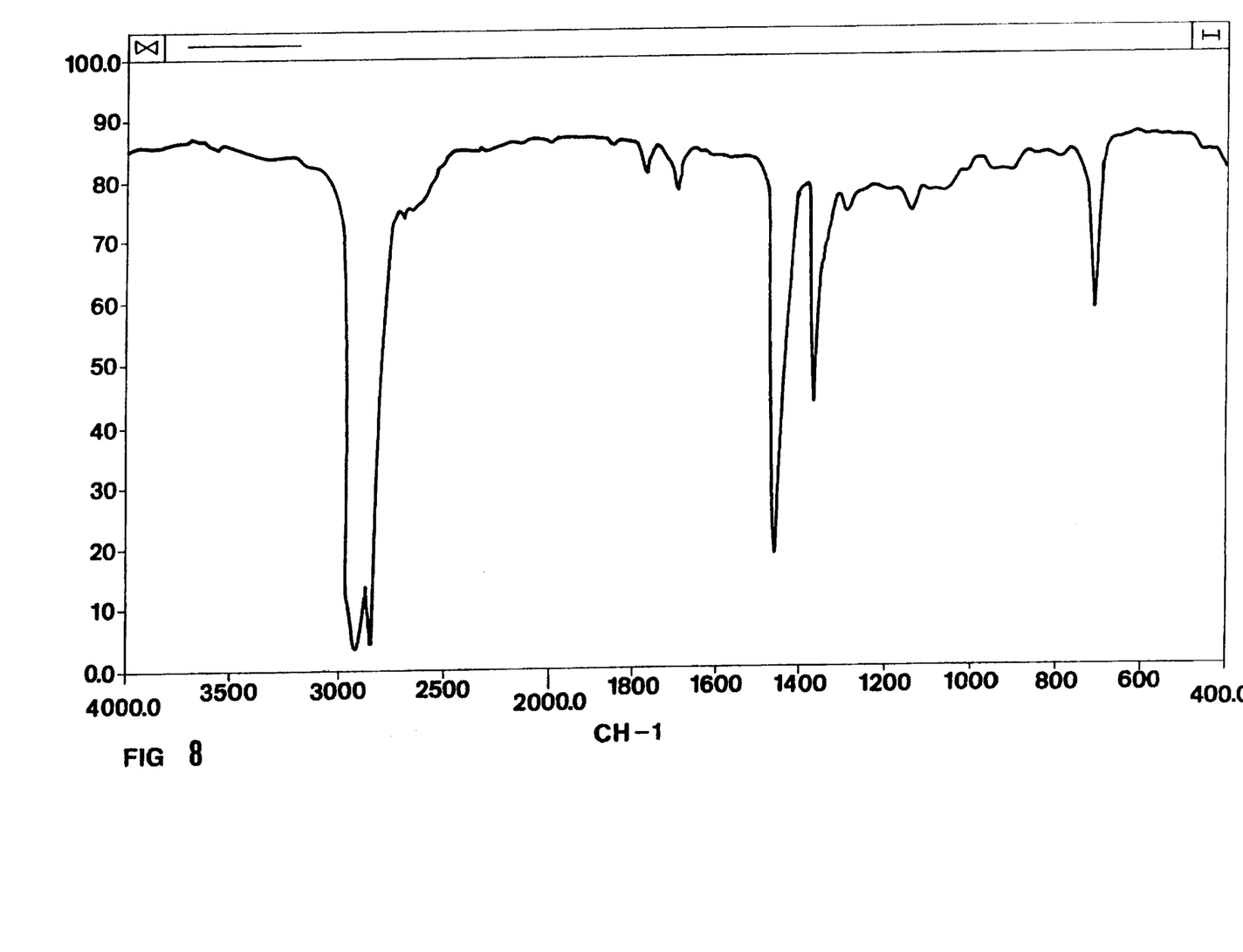
FIG. 8: IR spectrum of polyolefin functionalised with DEM and MAH. Continuous process (example A5).

The spectrum of the product obtained, shown in FIG. 8, revealed the signals already found in Example A4, which was a proof of the fact that double functionalization had taken place.

The parameters of the product obtained, appearing in Table 2, show a functionalization efficiency of 74%, without formation of toluene-insoluble products. The MFI rose from 0.5 to 0.7. The decrease in the contact angle found with respect to the starting product (from 97° to 94°) indicates the presence of polar groups (MAH, DEM) that are able to interact with the water used for the measurement.

Example A6

The test referred to in Example A4 was repeated, with the difference that the rates of feeding-in of the functionalizing mixture of EPR were increased to 5 Kg/hr and 175 Kg/hr, respectively.

Figure 9:
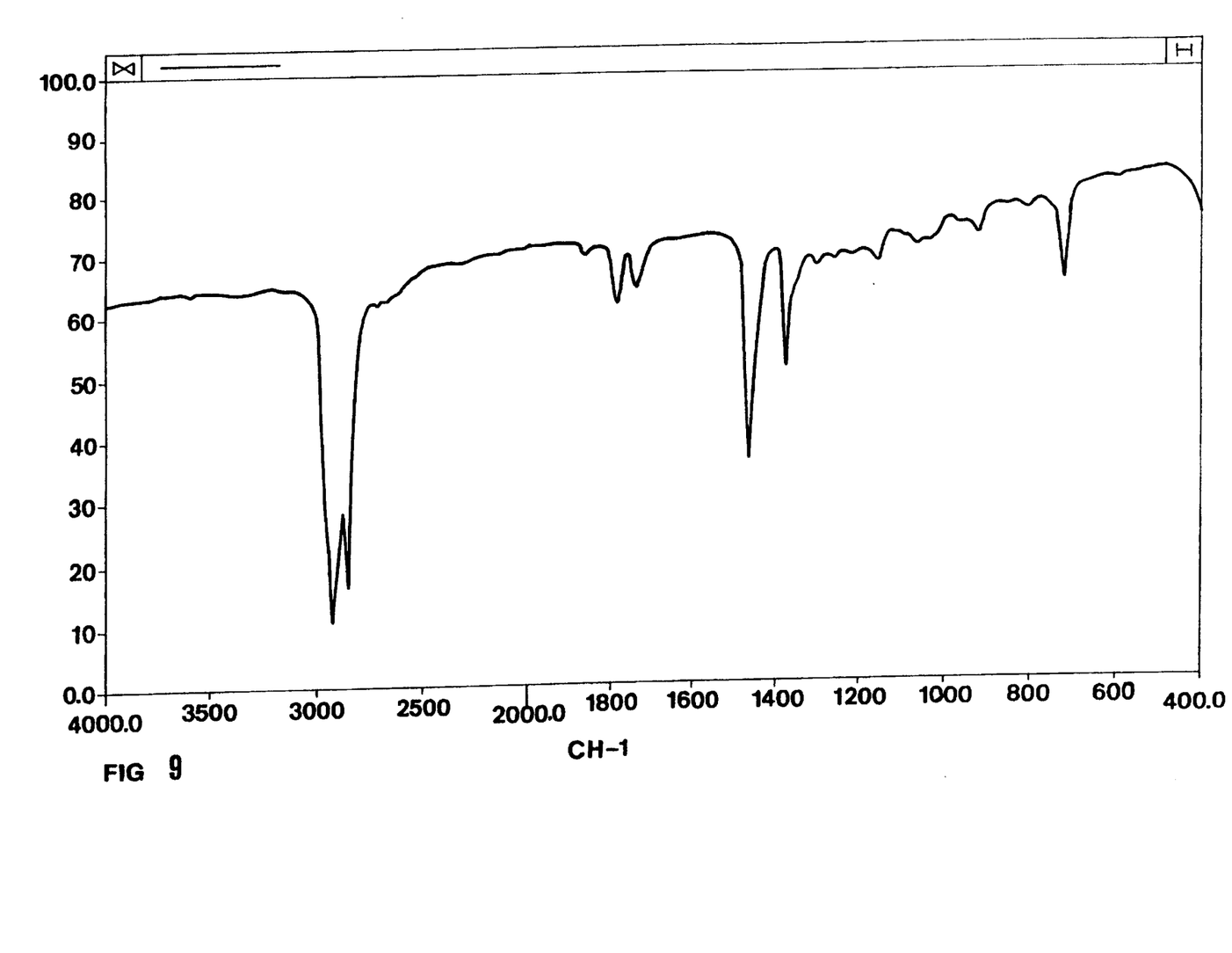
FIG. 9: IR spectrum of polyolefin functionalised with DEM and MAH. Continuous process (example A6).

The spectrum of the product obtained, shown in FIG. 9, presented the signals already recorded in Example A4, which was a proof of the fact that double functionalization had taken place.

The parameters of the product obtained, appearing in Table 2, show a functionalization efficiency of 82%, without formation of toluene-insoluble products. The MFI rose from 0.5 to 0.65. The decrease in the contact angle found with respect to the starting product was 5°.

TABLE 2

TESTS OF FUNCTIONALIZATION OF EPR - CONTINUOUS PROCESS

| TEST | MFI | Mw $10^{-3}$ | Mn $10^{-2}$ | Mw/Mn | MAH wt % at FEEDING-IN | DEM wt % at FEEDING-IN | DCP wt % at FEEDING-IN |
|---|---|---|---|---|---|---|---|
| COPOLYMER AS SUCH | 0.5 | 205 | 67.8 | 3 | — | — | — |
| 1 (comparison) | 1.2 | 145 | 37 | 3.9 | 0.9 | — | 0.06 |
| 2 (comparison) | 1.5 | 130 | 38 | 3.4 | 0.9 | — | 0.1 |
| 3 (comparison) | 1.0 | 152 | 46 | 3.3 | 1.5 | — | 0.1 |
| 4 | 0.6 | 170.4 | 55 | 3.1 | 0.46 | 0.14 | 0.04 |
| 5 | 0.7 | 172.6 | 59 | 2.9 | 0.95 | 0.28 | 0.08 |
| 6 | 0.65 | 169.5 | 57 | 3.0 | 1.1 | 0.34 | 0.1 |

| TEST | MAH + DEM DCP wt/wt | FUNCTION. MAH % | FUNCTION. EFFICIENCY % | % INSOLUBLE IN TOLUENE | CONTACT ANGLE |
|---|---|---|---|---|---|
| COPOLYMER AS SUCH | — | — | — | 0 | 97 |
| 1 (comparison) | 15.5 | 0.32 | 36 | 0 | — |
| 2 (comparison) | 10 | 0.45 | 48 | 4 | — |
| 3 (comparison) | 15 | 0.74 | 50 | 0 | — |
| 4 | 15 | 0.4 | 87 | 0 | — |
| 5 | 14.8 | 0.7 | 74 | 0 | 94 |
| 6 | 14.4 | 0.9 | 82 | 0 | 92 |

All the tests A1–A6 involved the use of a constant ratio between maleic derivatives and peroxide initiator in the feeding-in phase (corresponding to approximately 15, with the exception of Test A2, where the ratio was 10). The same extruder was used with the same thermal profile. Apart from the use of the porous carrier and the addition of the maleate that characterize the invention, the remaining reagents used were the same in all the tests. Likewise in all the tests from A4 to A6, the MAH/DEM weight ratio was kept constant at 3.2.

In the comparison Tests A1–A3, the functionalization efficiency did not exceed 50%. This efficiency rose, instead, to 74%–87% in Tests A4–A6, carried out in accordance with the present invention. The formation of products insoluble in toluene was prevented in all the tests (with the exception of A2). However, the comparison tests involved a considerable alteration of the MFI index, which doubled in the case of A1 and A3 and tripled in the case of A2. The modifications in the MFI were much more contained in the case of Tests A4 to A6: from 0.5 to 0.6–0.7. The smaller alteration in molecular weights indicated that an extremely more homogeneous product had been obtained.

6. Resistance Tests of Polyamide Compositions Reinforced with the Polyolefins that Form the Subject of the Invention Example B1

Impact Modification Test of Nylon-6 with the Modified Product of Example A6

In a double-screw extruder with L/D=36, the following were fed in: 80 parts of nylon-6 (Radillon 4/100, or else Sniamid S40) and 20 parts of the copolymer of Example A6, having 0.9% of functionalized maleic anhydride and approximately 0.18% of functionalized diethyl maleate. In this way, nylon-6 modified with 20 wt % of functionalized copolymer was obtained.

The extrusion was repeated a further two times, feeding in nylon and copolymer in the proportions 75:25 and 65:35, respectively.

With the three types of compounds obtained, specimens were injection-moulded according to the ASTM D256 Standard, on which impact tests were then carried out (Izod test, measured in J/m).

A comparison test was carried out with modified polyamide, in a weight ratio of 80:20, using the impact modifier commercially available as FM1 (ethylene-propylene copolymer), containing 0.9% of functionalized maleic anhydride. The results obtained are given in Table 3 below.

TABLE 3

| Composition tested | IZOD (23° C.) | IZOD (−20° C.) |
|---|---|---|
| Polyamide (PA6) | 34 | 29 |
| PA6 + FM1 (80:20) | 750 | 340 |
| PA6 + Example A6 (80:20) | 830 | 495 |
| PA6 + Example A6 (75:25) | 998 | 690 |
| PA6 + Example A6 (65/35) | 1020 | 1016 |

It may be noted that, given the same ratio of compatibilizing agent used (80:20), the polyamide functionalized according to the invention has impact-resistant characteristics that are similar or superior to those of the reference composition, in particular at low temperatures. When the compatibilizing agent was increased by 5% (75:25), the resistance increased by 33% (at 23° C.) and by 100% (at −20° C.), compared to the reference composition. Even more substantial increases were observed in the case of compositions made with the ratio of 65:35.

The example given shows that the use of the polyolefins according to the present is invention enables high-resistance, compatibilized compositions to be obtained that are competitive with, and superior to, commercially available compositions.

What is claimed is:

1. Polyolefins functionalized with maleic anhydride and at least one liquid ester of the latter having boiling point higher than 150° C., said polyolefins having a functionalization degree comprised between 2% and 20%, and being substantially free from cross-linking products.

2. Polyolefins according to claim 1, having functionalization degree comprised between 4% and 15%.

3. Polyolefins according to claim 1, wherein the polyolefin to be functionalized is selected from the group consisting of polyethylene, polypropylene, EPR (ethylene propylene rubber), EBR (ethylene butylene rubber), EPDM (ethylene-propylene-diene monomer), EVA (ethylene vinyl acetate), HDPE (high-density polyethylene), LLDPE (linear low-density polyethylene), VLDPE (very low-density polyethylene), and ULDPE (ultra low-density polyethylene).

4. Polyolefins according to claim 1, wherein said liquid ester is selected from the group consisting of diethyl maleate, dimethyl maleate, dipropyl maleate, dibutyl maleate, di-isopropyl maleate, di-isobutyl maleate, methyl maleate, ethyl maleate, propyl maleate, butyl maleate, iso-propyl maleate, and isobutyl maleate.

5. A process for the preparation of the functionalized polyolefins described in claim 1, carried out in either continuous or discontinuous phase, which comprises the following steps:
  a) preparation of a free-flowing dry composition (free-flowing dry blend) comprised of maleic anhydride, at least one of its high-boiling liquid esters, at least one radical initiator, and an appropriate quantity of hydrophobic solid inorganic carrier having the following characteristics: (1) surface area of between 100 and 400 $m^2/g$; (2) cumulative total volume of pores of between 1 and 2.5 $cm^3/g$; (3) mean diameter of particles of between 5 and 50 $\mu$m; (4) mean number of hydroxyls, both vicinal and isolated, lower than 1 mEq OH/g; (5) water content lower than 0.5 wt %; and
  b) feeding of the dry mixture obtained in step a) into the polyolefins to be functionalized.

6. The process according to claim 4, where the inorganic carrier is chosen from silicates, aluminas, and zeolites.

7. The process according to claim 4, where the radical initiator is chosen from dicumyl peroxide, terbutyl peroxide, dibenzoyl peroxide, and their mixtures.

8. A free-flowing dry blend for use in the preparation of functionalized polyolefins according to the process of claim 5, comprising:
  maleic anhydride, at least one of its high-boiling liquid esters, at least one radical initiator, and an appropriate quantity of hydrophobic solid inorganic carrier having the following characteristics: (1) surface area of between 100 and 400 $m^2/g$; (2) cumulative total volume of pores of between 1 and 2.5 $cm^3/g$; (3) mean diameter of particles of between 5 and 50 $\mu$m; (4) mean number of hydroxyls, both vicinal and isolated, lower than 1 mEq OH/g; (5) water content lower than 0.5 wt %.

9. A co-rotating double-screw extruder for the continuous production of functionalized polyolefins according to the process of claim 5, having a length of 40 diameters, and containing a feed mouth (b) for feeding in polyolefin at 2 diameters from the start of the extruder, a feed mouth (a) for feeding in the free-flowing dry blend at 12 diameters from the feed mouth, two degassing valves, (c) and (d), set, respectively, at 24 and 32 diameters from the feed mouth, and where all the lengths referred to above may vary by ±4 diameters.

10. A process to compatibilize or reinforce polymeric compositions, comprising the step of contacting said polymeric composition with the functionalized polyolefins of claim 1.

11. The process according to claim 10, wherein the functionalized polyolefins are added in mixture to polymeric components, or are present as an interlayer at the interface between materials to be compatibilized.

12. The process according to claim 10, wherein the interlayer has an adhesive function.

13. The process according to claim 10, wherein the polymeric composition to be reinforced is a polyamide.

14. The process according to claim 10, wherein the functionalized polyolefins are added to mixtures for the preparation of composite materials, or are interposed as binding agents between materials that are mutually incompatible.

15. Reinforced polyamide composition characterized in that it contains from 10% to 35%, by weight, of functionalized polyolefins according to claim 1.

* * * * *